May 18, 1954    J. E. GRANDIDGE    2,678,561
AIRCRAFT ALTIMETER

Filed March 9, 1950    3 Sheets-Sheet 1

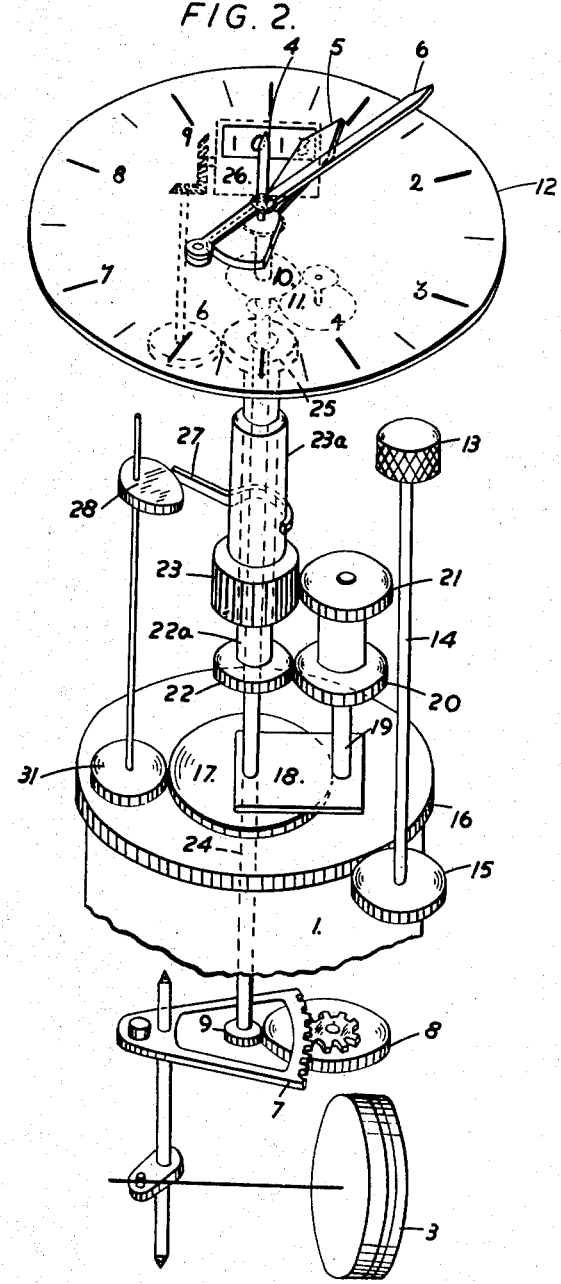

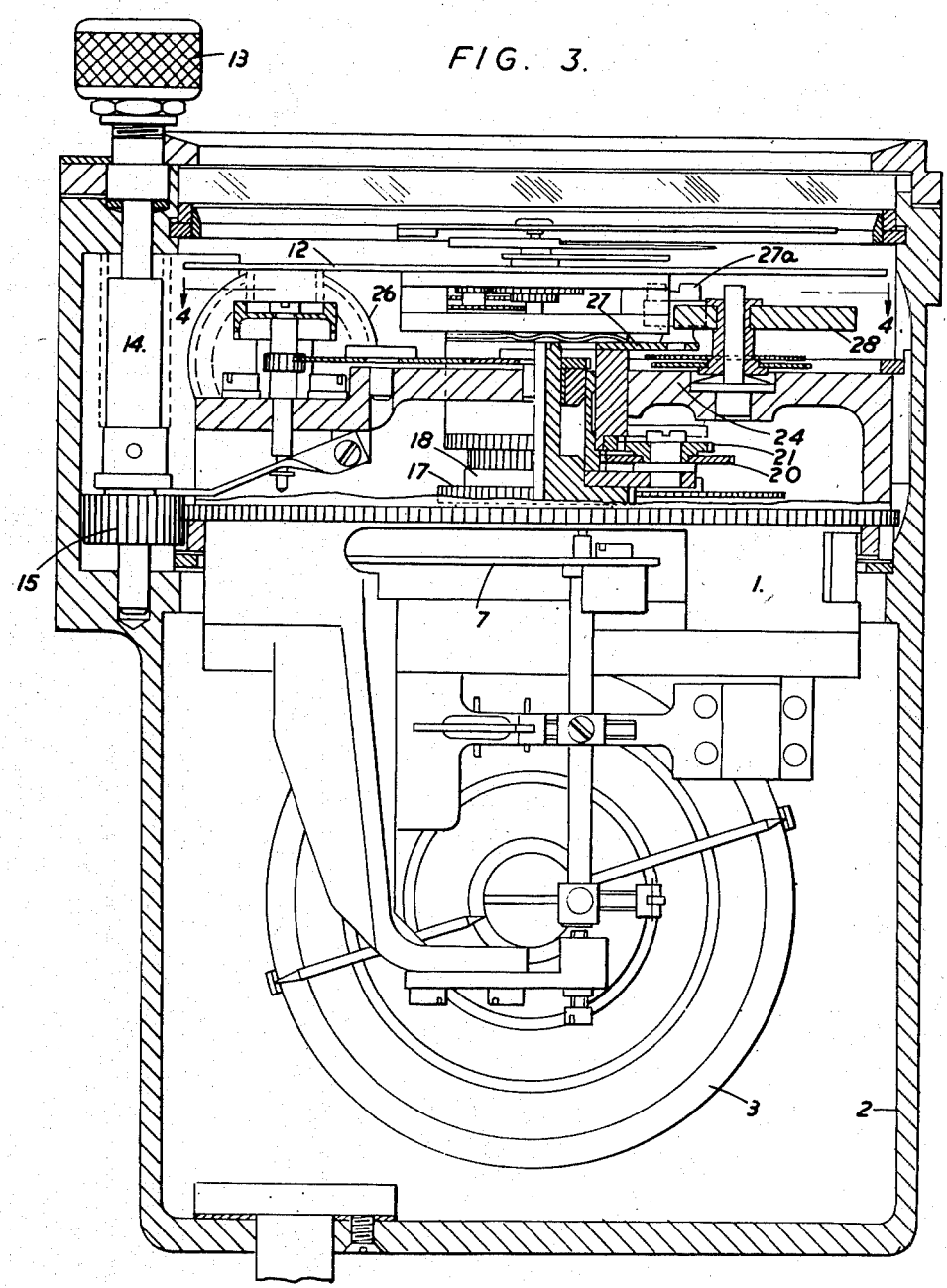

Patented May 18, 1954

UNITED STATES PATENT OFFICE 2,678,561

AIRCRAFT ALTIMETER

John Everard Grandidge, Basingstoke, England, assignor to Kelvin & Hughes Limited, Glasgow, Scotland, a company of Great Britain Application March 9, 1950, Serial No. 148,613
Claims priority, application Great Britain March 9, 1949

2 Claims. (Cl. 73—387)

This invention relates to altimeters of the barometric type which contain a sensitive element responsive to changes in atmospheric pressure. The invention is particularly applicable to instruments of the sensitive type in which a pointer or indicating means traverses the scale a number of times, e. g. one turn of the pointer per 1,000 feet, and subsidiary pointers or indicating means are suitably coupled to the main pointer so as to indicate the total height over the complete range of the instrument.

Altimeters of this type are calibrated according to a known law relating the pressure in the atmosphere to the height, and a correction or adjustment must be applied to the instrument to adjust its readings to suit the prevailing datum pressure which depends on the particular conditions of use, such as for landing at an airport where the ground pressure is known. For this reason, the instrument is provided with a separate, hand-operated scale, or pressure datum indicating means, known as the barometric scale, which is graduated in terms of pressure, usually millibars or inches of mercury and is suitably coupled to a hand setting part of the mechanism of the instrument whereby the instrument can be corrected to read the height according to the ground pressure conditions set on the barometric scale.

Assuming that the datum indicator is set at a particular ground pressure, then the instrument would read the correct height above or below this pressure level, and at this pressure level the pointer on the height scale would indicate zero within the prescribed tolerances. If the atmospheric pressure changes, the instrument remaining at its original position, then the height pointer will change by an amount corresponding to the change in pressure. In order to return the pointer to zero it is necessary to adjust the datum indicator to the prevailing pressure.

It has been established that the setting of the barometric datum indicator under difficult flying conditions or in an emergency, (e. g. forced landing), is simplified when the indicator takes the form of a "veeder" or drum counter, and an instrument having an indicator of the counter type is dealt with in the example about to be described.

It is known that the relationship between pressure and height is not of a linear character and it is an object of the invention to provide a control means in the hand-adjusting mechanism between the height and pressure datum indicators, which is of a non-linear character and conforms closely to a law relating atmospheric pressure and height which has been established by the International Convention for Aerial Navigation (hereinafter referred to as I. C. A. N.) or any other similar law.

The control means of this invention includes a differential gear between the datum and height indicating transmission which is acted upon by a cam device providing a control of, or correction to, the transmission to the datum indicator. The various ratios in the differential gear and the transmissions are so chosen that the correction to the datum transmission provided by the cam is small in relation to the full range of adjustment of the datum.

Mathematically the amounts of this correction can be derived by way of example thus: According to the I. C. A. N. law atmospheric pressure and height are related as follows:

$$PH = Po\left(1 - \frac{1.98H}{288}\right)^{5.256} \quad (1)$$

where $PH$ = pressure at any height.
$Po$ = standard ground pressure.
$H$ = height in thousands of feet.

Fig. 1 shows the curve to this equation. In this figure $PH_1$ = uncorrected value of the pressure at any height. The effect of the straight line shown intersecting the curve to Equation 1 graphically is produced mechanically by rotation of the differential gear and the height and datum indicating transmissions when the cam correction is absent and the equation to this line, when the range of datum adjustment is 800 to 1050 millibars, can be shown substantially to be $$PH_1 = -34H + 1017.28 \quad (2)$$

It will readily be seen that to modify this straight line so that it takes the form of the curve to Equation 1 it is necessary to subtract from it continually varying amounts of pressure or height units. The purpose of the cam device in this example is to provide this correction in pressure units, and the magnitude of these amounts can be derived from the expression:

$$PH_1 - PH = -34H + 1017.28 - 1013.2\left(1 - \frac{1.98H}{288}\right)^{5.25}$$

when expanding the term inside the brackets we have:

$$PH_1 - PH = 4.08 + 2.6H - .54H^2 + .004H^3 \text{ etc.} \quad (3)$$

A series of values for $PH_1 - PH$ can be calculated and from these values a cam profile may be developed. The cam can, of course, take two forms, depending upon which side of the curve to Equation 1 the straight line is placed. In the analysis used the cam applies maximum correction at the centre of its travel but in the other case maximum correction occurs at each end of the cam travel. As the cam described in the invention is of the latter form Equations 2 and 3 are then slightly modified.

The present invention thus consists in an altimeter of the type having an actuator responsive to pressure changes mounted in a movable housing and adapted to operate altitude indicating elements, and having also a pressure datum indicator, wherein said datum indicator and the altitude indicating elements are adapted to be set by means which ensure for any setting the correct relationship between the readings at any instant of the altitude indicator and the pressure datum indicator, said means comprising a gear train providing a linear driving connection for the altitude indicating elements, a second gear train providing a linear driving connection for the datum indicator and a third gear train incorporating a non-linear control over the second gear train.

From another aspect the invention consists in an instrument of the above mentioned type wherein the altitude indicating elements and datum indicator are presettable by manually adjustable means which operates the datum indicator through driving means including two sets of gear trains one of which provides a linear drive to the datum indicator, and the other a non-linear drive, the latter drive including a cam profiled to give corrections to the linear drive.

In order that the invention may be more clearly understood the same will now be described with reference to the accompanying drawings in which:

Fig. 1 shows a graph which indicates the departure from linearity of the I. C. A. N. curve.

Fig. 2 shows a perspective view, somewhat schematically, of the altimeter of the invention.

Fig. 3 shows a part sectional view of the instrument; and

Figure 1:
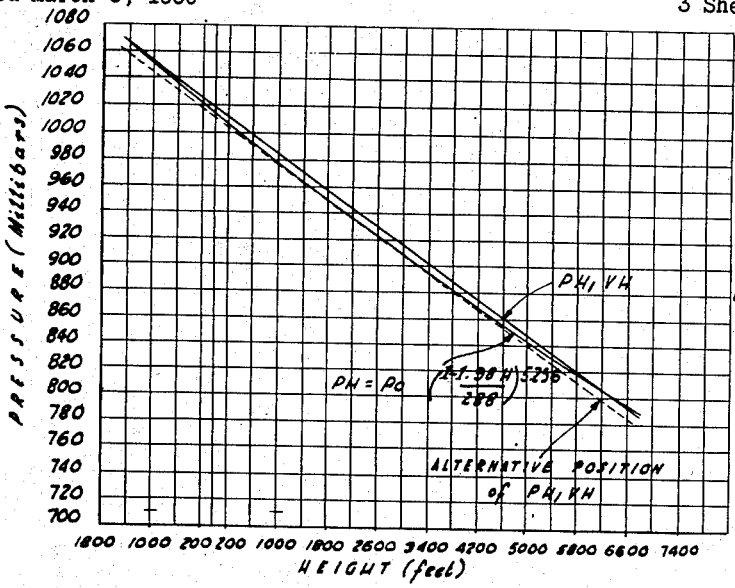

The following description, and the operation of the parts relevant to the invention, will be more easily followed if reference is made to the perspective drawing of Fig. 2, wherein the parts are shown in somewhat expanded and simplified form. The lower part of the instrument consists of a rotatable casing 1, suitably supported in a fixed outer casing 2 (Fig. 3) and includes the capsule element 3, sensitive to variations of atmospheric pressure and adapted to operate the pointers 4, 5, 6 through the usual quadrant and gear train 7, 8, 9. The pointers are geared together by gears, generally indicated by references 10, 11, so as to indicate height in units, tens and thousands, whilst the scale 12 is graduated from 0 to 9 in hundreds of feet.

A counter 26 of the Veeder type can be set by hand means 13 to indicate atmospheric pressure, in the present case in millibars, this reading serving as a reference or datum figure and which is varied from day to day and place to place to indicate the prevailing pressure at any place at which it is desired to make a landing.

The hand adjusting means consists of a knob 13 secured to a shaft 14 which actuates a pinion 15 in mesh with a gear wheel 16 secured to, or forming a part of, the casing 1. At the top of the gear wheel 16, and rotatable therewith, is a fixed pinion 17 which carries a plate 18 on which is mounted a pin 19 carrying integral planetary gears 20, 21 which are rotatable upon the pin. The planetary gears 20, 21 mesh with relatively rotatable, differential or sun gears 22, 23, concentrically disposed with respect to each other and the pointer staff 24. The lower wheel 22 has a sleeve 22a which passes upwardly through a sleeve 23a secured to wheel 23.

Figure 4:
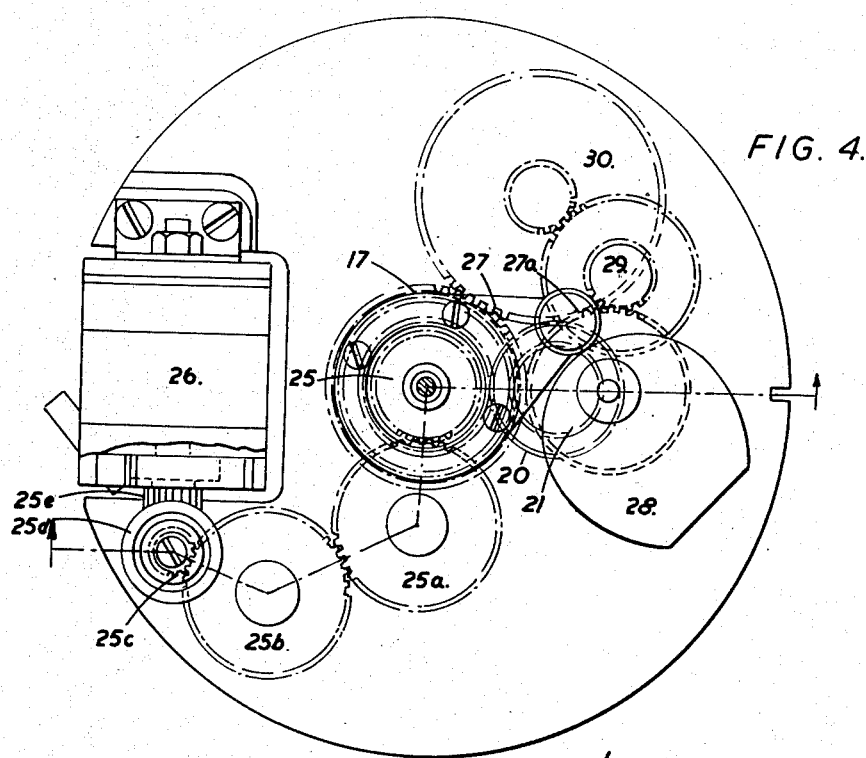
Fig. 4 shows a plan view taken on the line 4—4 of Fig. 3.

The latter sleeve rotates in a bearing or aperture 24 of a frame forming a part of the upper structure of the instrument. The upper end of the inner sleeve 22a is secured to a pinion 25 forming the first member of a gear train 25a, 25b, 25c, 25d, 25e (Fig. 4) for operating the Veeder counter 26. The external sleeve 23a carries an arm 27 having a cam follower 27a (Fig. 3) at its free end which is urged by spring means (not shown) into engagement with a cam 28 rotated through a train of gears 29, 30, 31 (Fig. 4) by the driving gear 17.

From the above, it will be seen that during normal operation the pointers 4, 5, 6 are actuated by the capsules 3, gear train 7, 8 and 9 and staff 24 quite independently of the hand-operated gears just referred to. When it is necessary, however, to adjust the height indicator to a new zero position on reaching a landing ground at a different altitude or subject to a different barometric pressure the counter reading is altered to correspond with that received from the new landing ground by adjusting the knob 13. This has the effect of rotating the entire lower casing 1 which carries with it the gear wheel 17 which carries around the planetary gear unit 20, 21 which, in rotating about the pin 19, actuates the independently operable sun gears 22, 23. The gear 22 actuates the counter train in the manner previously described. The movement of the counter up to the point just described has been directly in proportion to that given to the casing 1 by the knob 13 and the pointers, 4, 5, 6. In addition to the above gear movements however an additional movement is imparted by the simultaneous rotation of the cam 28 by gear 17, and due to the particular profile of the cam this latter movement, which is superimposed upon the planetary gears 20, 21, is not of a proportional or linear characteristic, so that there is a departure from the linear relationship between the movements of the counter and the pointers. The amount of this departure is closely in accordance with the curve $$PH = Po\left(1 - \frac{1.98H}{288}\right)^{5.256}$$

of Fig. 1.

From the above it will be seen that a mechanism has been devised which allows of greater accuracy in the adjustment of a pressure datum indicator in altimeters having a Veeder counter as a pressure datum indicator than has been heretofore possible.

I claim:

1. An altimeter comprising in combination with a barometric pressure responsive device, pointer means supported and operated by said pressure responsive device in accordance with barometric pressure, relatively stationary scale means cooperating with said pointer means, a counter stationary relative to said scale and setting means for setting the altimeter to a predetermined barometric pressure and simultaneously operating the counter, said setting means including a manually operable means for bodily rotating said pressure responsive device with respect to the scale means and thereby changing the data-setting of said counter and the pointer reading of said scale simultaneously, a sun and planetary gear system for adjusting said counter operable by said manually operable means including a cam adapted to produce a non-linear output motion when the cam is driven by a linear input, said gear system including a gear concentrically rotatable with the pressure responsive device and carrying an eccentrically mounted pin, two planetary gears fixedly secured together and rotatably mounted on said pin, and two relatively rotatable differential sun gears mounted about the axis of rotation of said gear carrying the pin, and a gear train driven by one of said sun gears for operating the counter, said cam being driven by the first mentioned gear and the other of said sun gears being driven by said cam in accordance with the said non-linear output motion, whereby, linear input by the manually operable means is accompanied by a non-linear change in the setting of the counter.

2. An altimeter comprising a relatively stationary scale, altitude indicators movable over the scale, a counter stationary relative to said scale and adjustable for setting thereon barometric pressure data, a pressure responsive device rotatably mounted relative to said scale, said device supporting and arranged to operate such altitude indicators in accordance with barometric pressure, manually operable means for rotating said pressure responsive device with respect to said scale to thereby change the data-setting of said counter and the indicator reading of said scale simultaneously, a counter adjusting means operated by rotation of said device, said adjusting means including a gear concentrically rotatable with the pressure responsive device, a pin carried by and eccentrically mounted with respect to said gear, two planetary gears fixedly secured together and rotatably mounted on said pin, a sun gear meshed with one of said planetary gears, another sun gear meshed with the other planetary gear, both sun gears being individually rotatably mounted about the axis of rotation of the first-named gear, a cam having a non-linear operating surface, a follower on one of said sun gears and in driving contact with said cam surface, said cam being operable by the rotation imparted to the said pressure responsive device by the said manually operable means to move the operating surface thereof with respect to said follower to position said follower according to the contour of said operating surface, gear means connected between the other of said sun gears and said counter to drive said counter when the said other sun gear rotates, whereby when the said manually operable means is operated, the extent of motion thus imparted to said pressure responsive device and indicators and the extent of motion imparted simultaneously to said counter, will be non-linear with respect to each other.

References Cited in the file of this patent
UNITED STATES PATENTS

| Number | Name | Date |
|---|---|---|
| Re. 20,948 | Kollsman | Dec. 13, 1938 |
| 1,970,544 | Carbonara | Aug. 21, 1934 |
| 2,323,166 | Urfer | June 29, 1943 |
| 2,552,377 | Jenny | May 8, 1951 |